Patented Dec. 5, 1939

2,182,511

UNITED STATES PATENT OFFICE 2,182,511

PRODUCTION OF FLUOBORATE COMPOUNDS

Harold W. Heiser, East St. Louis, Ill., assignor to Aluminum Company of America, Pittsburgh, Pa., a corporation of Pennsylvania No Drawing. Application August 9, 1939, Serial No. 289,312

9 Claims. (Cl. 23—59)

This application is a continuation-in-part of my copending application Serial No. 144,412, filed May 24, 1937.

The invention relates to the extraction of fluorine values from fluorspar ores, and is particularly concerned with a method for the production of hydrofluoboric acid and the soluble fluoborate salts.

The commercial processes that have been generally used for the recovery of the fluorine values of fluorspar ores involve the decomposition of the fluorspar at elevated temperatures in the presence of strong mineral acids such as sulfuric acid. The fluorine content of the ore is liberated in gaseous form as hydrofluoric acid containing hydrofluosilicic acid as an impurity in an amount dependent upon the amount of silica present in the fluorspar ore used, and the residue is a highly calcined calcium compound of the mineral acid used, such as anhydrous calcium sulfate. The recovery of the hydrofluoric acid is generally accomplished by condensation of the gas in water. The handling of this gaseous product is, however, quite difficult and expensive, and the elevated temperatures used require equipment highly resistant to acid corrosion. Furthermore, as a result of the high temperatures used, the by-product calcium salt produced is generally in such form as to require considerable processing to make it commercially useful. This is particularly so when a by-product calcium sulfate is produced in anhydrous form. In order to make the anhydrous calcium sulfate suitable for use in the plaster industry, which is the most obvious outlet for this by-product, it is necessary that a difficult and expensive hydration step and a subsequent partial dehydration step be performed.

These processes require the use of the so-called "acid-grade" fluorspar ores to keep the contamination of the product by silica to an acceptable minimum. Acid-grade fluorspar is generally specified to contain less than 1 per cent of silica, and such material occurs only sparingly in nature. Natural fluorspar ores containing higher percentages of silica must be subjected to elaborate and expensive purification processes to reduce the quantity of silica present before the material is acceptable for use in the previously used acid-recovery processes. These factors have contributed a large element to the relatively high cost of fluorine-containing compounds which are required to be substantially free from silica.

It is an object of this invention to provide an improved method for the extraction of fluorine values from fluorspar ores in which no gaseous fluorine compounds are produced and the difficulties incident to the handling of such compounds are thus eliminated. Another object of this invention is to provide a method for the extraction of the fluorine content from fluorspar ores, which method is carried out at moderate temperatures, and in which the by-product calcium sulfate is produced in the form of hydrated calcium sulfate and is readily rendered utilizable for commercial applications. A further object of my invention is to provide a method for the production of substantially silica-free hydrofluoboric acid and soluble fluoborate salts by the decomposition of fluorspar containing silica as an impurity at moderate temperatures, with the simultaneous production of hydrated calcium sulfate.

My invention is predicated upon the discovery that by digestion of calcium fluoride or other alkaline earth fluorides with an aqueous solution of sulfuric acid containing boric acid or a boric acid compound (by which term is meant a metallic salt of boric acid such as calcium or sodium borate), a solution of hydrofluoboric acid or a soluble fluoborate salt substantially free from silica and hydrated calcium sulfate may be produced. By this method I have found that substantially complete recovery of the fluorine content of a fluorspar ore may be effected without the necessity of using a gas-tight apparatus or apparatus which is highly resistant to corrosion by hydrofluoric acid. Furthermore, I have found that a hydrofluoboric acid or fluoborate solution which is substantially free from silica may be produced by this method even though a low-grade fluorspar containing a relatively high percentage of silica is used as the starting material, and a highly valuable by-product of hydrated calcium sulfate may be obtained.

In carrying out the process of my invention in the preferred manner, fluorspar or calcium fluoride is first ground to a suitably small particle size. Either relatively pure (acid-grade) spar or low-grade spar containing substantial amounts of calcite or silica or both may be used. Calcite in the fluorspar ore does not interfere with the practice of the process except insofar as it uses up sulfuric acid and is converted to hydrated calcium sulfate. As above noted, the presence of silica in the ore is not detrimental to the hydrofluoboric acid or soluble fluoborate produced, since the silica has been found to be substantially insoluble in the digest liquor at the moderate temperatures used, presumably due to the presence of the boric acid or boric acid compound, and particularly when the boric acid or boric acid compound is present in excess of the stoichiometric amount required to combine with all of the fluorine released from the calcium fluoride in solution. For example, I have been able produce fluoborate solutions containing substantially no silica from fluorspar ores containing as high as 15 per cent silica. As the silica is insoluble in the digest liquor at the temperatures used, it settles out of the solution with the calcium sulfate which is precipitated.

In the practice of my invention, ground fluorspar is mixed in a suitable vessel with an aqueous sulfuric acid solution containing boric acid or a salt capable of yielding boric acid in acid solution. For this purpose, I have found it most desirable to use a 10 to 20 per cent solution of sulfuric acid in water in an amount sufficient to provide the theoretical quantity or somewhat less than the theoretical quantity of sulfuric acid required to decompose all the calcium fluoride present in the spar. While an excess of sulfuric acid may be used if desired, the excess over that required for reacting with the calcium fluoride will remain in the hydrofluoboric acid or fluoborate product. In order to obtain a maximum yield and a product substantially free from silica, the boric acid compound is preferably somewhat in excess of the amount required to combine with all of the fluorine in the fluorspar, according to the equation

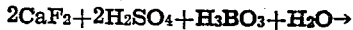

$$2CaF_2 + 2H_2SO_4 + H_3BO_3 + H_2O \rightarrow HBF_4 + 2CaSO_4.2H_2O$$

The finely ground fluorspar and the aqueous solution of sulfuric acid and boric acid compound are then preferably heated to a temperature of 70° to 100° C. for a period of 1 to 3 hours, within which time substantially complete reaction can be effected. Shorter periods of digestion at higher temperatures, or longer periods of digestion at temperatures as low as room temperature may be used if desired, but for commercial practice I have found it most convenient to digest the mixture at temperatures below the boiling point for a period sufficient to produce substantially complete reaction.

The digestion of the fluorspar with the sulfuric acid solution containing the boric acid compound may be carried out in two stages to produce substantial economies by the complete extraction of the fluorine from the fluorspar and the production of a hydrofluoboric acid or a soluble fluoborate substantially free from sulfuric acid. In carrying out the process in this manner, an excess of fluorspar is first treated with sulfuric acid solution containing the boric acid compound. The hydrofluoboric acid solution thus produced is separated from the hydrated calcium sulfate sludge containing the excess fluorspar and the insoluble impurities in the fluorspar, including silica. The sludge is then digested with an excess of a fresh solution of sulfuric acid containing the boric acid compound to obtain complete extraction of the fluorine from the fluorspar remaining in the sludge. The solution thus produced is then used in treating a further quantity of fluorspar ore in excess. By a continuous two-stage digestion process operated in this manner, it is possible to effect substantially complete recovery of the fluorine. Yields as high as 99.8 per cent of the fluorine present in the fluorspar have been obtained in this manner.

It is to be understood that if desired, the sulfuric acid may be replaced in part by an equivalent sulfate salt in the digestion liquor, or the source of the boric acid may be wholly or in part a salt of boric acid. When the sulfuric acid is replaced in part by an equivalent sulfate salt, or the boric acid is replaced in whole or in part by a salt of boric acid, the salt selected should be one which will give a compound of hydrofluoboric acid which is soluble in the solution under the digestion conditions used, and by the expression soluble salts of hydrofluoboric acid is meant those salts of the acid which are substantially soluble in the solution under the conditions discussed herein. In such case, the solution obtained from the digestion of the fluorspar will contain an equivalent proportion of the corresponding fluoborate salt.

When a two-stage digestion of fluorspar is carried out and an excess of a relatively strong sulfuric acid solution, such as a 20 per cent sulfuric acid solution containing a boric acid compound and a substantial amount of sodium sulfate, is used in the second digestion stage (in which the sludge containing hydrated calcium sulfate and fluorspar is digested), not only is the fluorine extracted from the sludge, but the hydrated calcium sulfate is converted to finely divided anhydrous calcium sulfate. Thus, by suitable regulation of the conditions of operation and the composition of the digest liquor, it is possible to produce either hydrated or anhydrous calcium sulfate as a by-product of the method of my invention.

As an example of the production of a hydrofluoboric acid free from sulfuric acid and silica in a single stage process, 252 grams of fluorspar containing approximately 83.2 per cent $CaF_2$, 12.7 per cent $SiO_2$, and 3.2 per cent $CaCO_3$ was digested in a 1000 c. c. aqueous solution containing 260 grams $H_2SO_4$ and 100 grams $H_3BO_3$ at a temperature of 90° C. for a period of 2 hours. The hot slurry was filtered and the liquor allowed to cool. It was found that the clear cooled liquor contained a solution of 108 grams per liter of substantially silica-free hydrofluoboric acid. The calcium sulfate residue which was removed from the filtrate contained all of the silica that was present in the raw fluorspar, while the fluoride content of the residue showed that 92 per cent of the total fluorine had been extracted from the original fluorspar. As the fluorspar digested was in an amount equal to 105 per cent of the stoichiometrical quantity required, the maximum amount of fluorine which could have been recovered would have been about 95 per cent.

Higher fluorine recovery may be obtained by the use of an excess of sulfuric and boric acids. For example, finely ground fluorspar was digested with an aqueous 10 per cent solution of $H_2SO_4$ containing boric acid in an amount equivalent to about 150 per cent of the theoretical requirement. The digestion was carried out for a period of two hours at a temperature of 90 to 93° C. The hydrofluoboric acid liquor thus formed was filtered off from the solid hydrated calcium sulfate. The liquor contained 97.6 per cent of the fluorine originally present in the fluorspar.

Still higher fluorine recovery values may be obtained by the use of a two-stage digestion process, in which a large excess of fluorspar is used in the first stage and, in the second stage, a large excess of sulfuric and boric acids is used to insure extraction of the fluorine from the $CaSO_4$–$CaF_2$ residue resulting from the first stage, the liquor from the second stage digestion being subsequently treated with an excess of fluorspar to produce more hydrofluoboric acid. As an example of the preparation of hydrofluoboric acid by this latter method, a 1000 c. c. aqueous solution containing 264 grams $H_2SO_4$ and 100 grams $H_3BO_3$ was used to digest 360 grams of fluorspar containing approximately 83.2 per cent $CaF_2$, 12.7 per cent $SiO_2$, and 3.2 per cent $CaCO_3$. The hot slurry was filtered and the liquor allowed to cool. An analysis of the clear cooled liquor showed that it was a solution containing 114 grams per liter $HBF_4$. The $CaF_2$–$CaSO_4$ residue was then redigested at 90° C. for 2 hours in 1000 cubic centimeters of an aqueous solution containing 264 grams $H_2SO_4$ and 100 grams $H_3BO_3$. An analysis of the residue from this digestion showed that substantially all of the silica in the original fluorspar was present in the calcium sulfate residue, and a fluorine extraction of over 99 per cent was obtained.

I claim:

1. A method for the production of a material selected from the group consisting of hydrofluoboric acid and its salts which comprises digesting fluorspar with an aqueous solution of sulfuric acid and a material selected from the group consisting of boric acid and boric acid salts.

2. A method for the production of a material selected from the group consisting of hydrofluoboric acid and its salts which comprises digesting fluorspar with an aqueous solution of sulfuric acid and a material selected from the group consisting of boric acid and boric acid salts at a temperature below the boiling point.

3. A method for the production of a material selected from the group consisting of hydrofluoboric acid and its salts which comprises digesting fluorspar with an aqueous solution of sulfuric acid and a material selected from the group consisting of boric acid and boric acid salts at temperatures of 70° to 100° C. for a period of 1 to 3 hours.

4. A method for the extraction of fluorine values from fluorspar ores comprising digesting the fluorspar with an aqueous solution of sulfuric acid containing a material selected from the group consisting of boric acid and boric acid salts.

5. A method for the extraction of fluorine values from fluorspar ores comprising digesting the fluorspar with an aqueous solution of sulfuric acid containing a material selected from the group consisting of boric acid and boric acid salts at temperatures of 70° to 100° C. for a period of 1 to 3 hours.

6. A method for the production of a material selected from the group consisting of hydrofluoboric acid and its salts, comprising digesting an excess of fluorspar with an aqueous solution of sulfuric acid containing a material selected from the group consisting of boric acid and boric acid salts, separating the solution thus formed from the sludge containing hydrated calcium sulfate and the excess fluorspar, digesting the sludge with a further quantity of an aqueous solution of sulfuric acid containing a material selected from the group consisting of boric acid and boric acid salts in excess of the amount required to extract the fluorine content of the sludge, separating the solution thus formed, and digesting a fresh quantity of fluorspar in excess with said solution.

7. A method for the recovery of fluorine values substantially free from silica from fluorspar containing silica, comprising digesting fluorspar with an aqueous solution of sulfuric acid containing a material selected from the group consisting of boric acid and boric acid salts to form a solution of hydrofluoboric acid and its soluble salts, and precipitating calcium sulfate together with the insoluble impurities present in the fluorspar.

8. A method for the recovery of fluorine values substantially free from silica from fluorspar containing silica, comprising digesting fluorspar with an aqueous solution of sulfuric acid containing a material selected from the group consisting of boric acid and boric acid salts to form a solution of hydrofluoboric acid and its soluble salts, and separating the calcium sulfate formed together with the insoluble impurities present in the fluorspar from the solution of hydrofluoboric acid and its salts.

9. A method for the recovery of fluorine values substantially free from silica from fluorspar containing silica, comprising digesting fluorspar with an aqueous solution of sulfuric acid containing a material selected from the group consisting of boric acid and boric acid salts to form a solution of hydrofluoboric acid and its soluble salts, said material being present in an amount in excess of the stoichiometric amount required to combine with all of the fluorine recovered, and separating the calcium sulfate formed together with the insoluble impurities present in the fluorspar from the solution of hydrofluoboric acid and its salts.

HAROLD W. HEISER.